United States Patent [19]
Scherer et al.

[11] Patent Number: 6,019,315
[45] Date of Patent: Feb. 1, 2000

[54] AIRCRAFT DOOR STRUCTURE WITH AN AIR FLOW SYSTEM

[75] Inventors: Thomas Scherer; Michael Dreyhaupt, both of Hamburg; Heiko Luetjens, Pinneberg, all of Germany

[73] Assignee: DaimlerChrysler Aerospace Airbus GmbH, Hamburg, Germany

[21] Appl. No.: 08/942,591

[22] Filed: Oct. 2, 1997

[30] Foreign Application Priority Data

Oct. 2, 1996 [DE] Germany .................. 196 40 741

[51] Int. Cl.[7] .................................................. B64C 1/14
[52] U.S. Cl. ............................ 244/129.5; 244/129.1; 454/76; 49/408
[58] Field of Search ........................ 244/129.5, 118.5, 244/118.1; 49/471, 504, 408; 454/76, 195

[56] References Cited

U.S. PATENT DOCUMENTS

| | | |
|---|---|---|
| 376,827 | 1/1888 | Louis et al. . |
| 691,260 | 1/1902 | Giesser . |
| 1,674,535 | 6/1928 | Verville . |
| 2,058,659 | 10/1936 | Bellanca . |
| 4,854,010 | 8/1989 | Maraghe et al. . |
| 5,064,147 | 11/1991 | Nobel et al. . |

FOREIGN PATENT DOCUMENTS

| | | | |
|---|---|---|---|
| 38 02 583 | 8/1989 | Germany ........................ | 454/195 |
| 14848 | 9/1887 | United Kingdom ............. | 454/195 |
| 2192451 | 1/1988 | United Kingdom ............. | 454/195 |

*Primary Examiner*—Charles T. Jordan
*Assistant Examiner*—Tien Dinh
*Attorney, Agent, or Firm*—W. F. Fasse; W. G. Fasse

[57] ABSTRACT

A door and its frame especially in an aircraft are constructed for circulating air through the structure for preventing cold air from forming near the door in an aircraft cabin. For this purpose at least one air flow channel is provided in the door construction. The air flow channel communicates with at least one inlet port with at least one outlet port so positioned that air circulation is maintained through the door structure. The outlet port passes preferably through a cabin floor for discharging cold air into a space below the cabin floor.

10 Claims, 1 Drawing Sheet

AIRCRAFT DOOR STRUCTURE WITH AN AIR FLOW SYSTEM

FIELD OF THE INVENTION

The invention relates to a door structure, especially for an aircraft. The door structure is equipped with an aircraft flow system for keeping the door and its frame at a cabin temperature.

BACKGROUND INFORMATION

Various conventional sealing efforts for aircraft door structures still leave such doors as a weak spot in terms of thermally insulating the aircraft cabin from the exterior. Thermographic images have shown that the doors constitute such weak spots. Especially door sections near the cabin floor have low surface temperatures when an aircraft is flying at high altitudes through an extremely cold environment. Such low temperatures of the inner door surface and of the door frame particularly near the cabin floor are unpleasant for passengers and crew. Due to these cold surface temperatures the circulation inside the aircraft is adversely affected near the doors because a cool draft is formed just above the cabin floor due to a convection flow downwardly along the inner door surface. Thermal seals between the door and its frame have so far not brought thermally satisfactory solutions of the above problem.

Separately and actively heating the aircraft doors is also not a satisfactory solution because such heating involves a substantial energy consumption which should be avoided if possible in view of the extra fuel consumption such separate heating would require. Moreover, door heaters with their sensors and controls would increase the initial and operating costs of an aircraft. Separate temperature sensors and controls would also increase maintenance work to assure that the door heaters work properly and independently of the cabin heating system.

OBJECTS OF THE INVENTION

In view of the above it is the aim of the invention to achieve the following objects singly or in combination:

to construct a door, especially an aircraft door, and its frame in such a way that without the use of an active separate heater, the above mentioned downward cold drafts along the inner surface of the door and its frame are avoided or at least reduced to acceptable levels;

to improve the thermal characteristics of aircraft doors and their frame structure by circulating air therethrough by a convection flow; and to avoid the use of active and/or moving controls for the air flow through a door structure, thereby maintaining such flow by a convection flow and removing cold air into a space, preferably a space below the cabin floor to prevent the cooling of the cabin air near the aircraft doors.

SUMMARY OF THE INVENTION

According to the invention an aircraft door structure comprises a door frame for installation in an opening of the aircraft body and a door installed in the door frame. Such a structure is equipped with at least one air flow channel in the aircraft door structure for circulating air through the aircraft door structure. At least one inlet port is positioned and connected for admitting air into the air flow channel and one outlet port is connected to and communicates with the at least one air flow channel with a space for discharging air, especially cold air into this space which is preferably positioned below the cabin floor. For this purpose the outlet port passes at the lower edge of the door or door frame through the cabin floor. The construction and position of the inlet and outlet ports is such that the air circulation is preferably sustained by convection.

In a preferred embodiment an air flow channel is formed in a gap between the door frame and the door and an other air flow channel passes through the door itself. Both channels have at least one common inlet port at the top edge of the door and at least one outlet port near the bottom edge of the door or frame.

By passing warm cabin air into the air flow channel or channels in the door structure at the top thereof, the air cools down inside the channels, thereby travelling downwardly through the outlet port into a space where the cold air does not form a draft that otherwise would adversely affect the passengers. Such space is preferably below the cabin floor but could be any space within the cabin, for example a closet.

By passing warm cabin air through the door structure, the thermal characteristics around the door structure are substantially improved without the need for active heating equipment and controls. No heated floor plates are needed according to the invention near the door area. Additional energy is not needed for the present system because it utilizes the warm cabin air more efficiently. Active controls are also avoided, whereby the present system is substantially maintenance free except for keeping the air flow passage open for the intended purpose.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
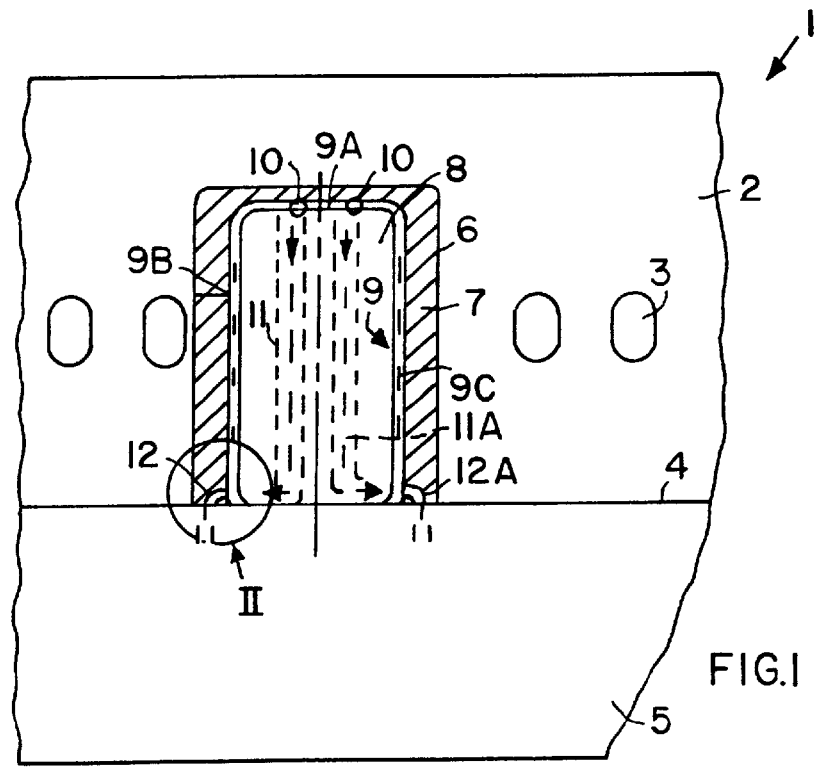
FIG. 1 shows schematically a plane view of an aircraft door structure with its frame shown in section to illustrate the position of the air flow channels according to the invention.

FIG. 1 shows a portion of an aircraft body 1 enclosing a passenger cabin 2 including windows 3 and a cabin floor 4 separating a space 5 below the floor 4 from the cabin 2. An opening 6 in the aircraft body is constructed to hold a door frame 7. A door 8 is installed in the door frame 7.

According to the invention at least one air flow channel is provided in the door structure 7, 8. Preferably, two such channels are arranged in the door structure. A first air flow channel 9 extends, in the form of a gap, between the door frame 7 and the door 8. The flow channel or gap 9 has three sections, namely a top section 9A extending horizontally between the top door frame portion and the upper end of the door 8, a left-hand section 9B between the left vertical door frame portion and the respective door edge and a right-hand channel or gap section 9C between the right-hand door edge and the right-hand frame section. These sections 9A, 9B and 9C become enclosed air flow channels only when the door is closed.

The first top air flow section 9A has at least one air inlet port 10 positioned near the upper end of the door 8 and upper frame portion. The inlet port 10 communicates with the top flow section 9A which in turn communicates with the lateral vertical air flow sections 9B and 9C. Second or additional air flow channels 11 and 11A pass directly through the door from the top to the bottom thereof.

At least one outlet port 12, preferably several such outlet ports 12 and 12A are positioned to pass through the lower ends of the door frame and preferably also through the cabin floor 4. The air outlets 12, 12A communicate with all flow channels 9, 9A, 9B, 11 and 11A to pass air flowing through these channels through the cabin floor into the space 5.

Figure 2:
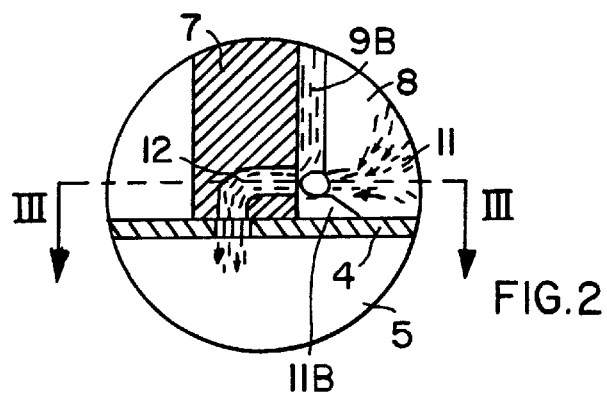
FIG. 2 shows on a somewhat enlarged scale a detail II of FIG. 1.

FIG. 2 shows how the outlet port 12 passes through the cabin floor 4 for communicating the space 5 with the channels 9 and 11 when the door 8 is closed. The channels 11 have an outlet 11B for this purpose. The outlet port is preferably a simple elbow installed in the lower end of the door frame 7. In the closed position of the door 8, the outlet 11B of the channels 9B and 11 communicates with the outlet port 12 to discharge cold air, thereby preventing the cold air from creating a draft, especially near the lower end of the door 8.

Figure 3:
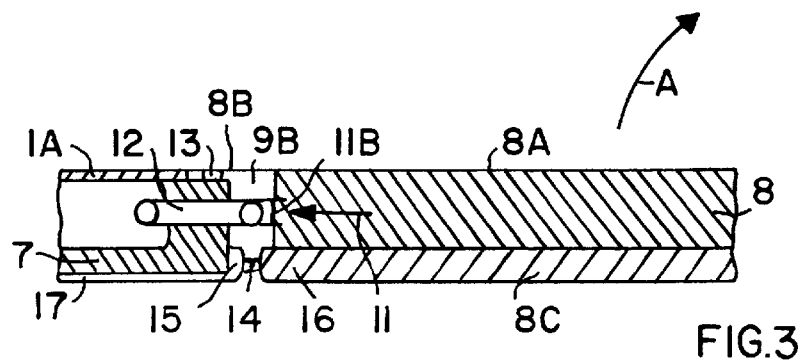
FIG. 3 is a sectional view substantially along section line III—III in FIG. 2.

FIG. 3 shows a sectional view along section line III—III in FIG. 2 of the lower end of the door 8 and of the door frame 7. the door 8 has an outer skin 8A with a flange extension 8B and an inner door cover 8C. The door opens outwardly in the direction of the arrow A. A first seal 13 is positioned between the door frame 7 and the flange 8B of the door 8. The first seal 13 seals the door and the flow channel section 9B against the outside of the aircraft body 1 which is covered with an outside body skin 1A. A second seal 14 is positioned between a frame edge or frame molding edge 15 and a door edge or door cover edge 16. Preferably, the frame 7 is covered on the inside with a frame molding 17 that forms the edge 15. The seal 14 and the edges 15 and 16 close the air flow gap 9B between the frame 7 and the door 8 toward the inside of the aircraft.

The air flow is established by convection so that cold air is discharged from the lower end of the door through the floor 4 into the below deck space 5.

The flow channel sections 9A, 9B and 9C are enclosed all around except for the inlet openings or ports 10 and for the communication with the outlet port 12. The flow channels 11, 11A inside the door may assume any configuration and extent through the inner door structure without interfering with the component normally housed inside an aircraft door. The flow channels 11, 11A also communicate with the openings or ports 10, 12.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft comprising an aircraft body, a floor (4) in said aircraft body dividing said aircraft body into an aircraft cabin above said floor and a space (5) below said floor, a door structure inserted into an opening in said aircraft body, said door structure comprising a door frame (7) installed in said opening, a door (8) installed in said door frame (7), at least one air flow channel (9) formed as a gap between said door (8) and said door frame (7) when said door is closed for passing air through said air flow channel (9), at least one air inlet port (10) positioned for admitting air from said aircraft cabin into said air flow channel (9) at a top of said door for a downward convection flow, and at least one air outlet port (12) passing through said floor and connecting said at least one air flow channel (9) with said space (5) below said floor (4) in said aircraft body for discharging air into said space when said door is closed.

2. The aircraft of claim 1, comprising a first seal (13) positioned for sealing said door relative to the outside of said aircraft and a second seal (14) positioned for sealing said door relative to said aircraft cabin inside said aircraft, and wherein said at least one air flow channel (9) is closed outwardly by said first seal and inwardly by said second seal when said door is closed.

3. The aircraft of claim 1, wherein said at least one air flow channel (9) comprises a first gap section (9A) extending between said door frame and an upper door end, and second and third gap sections (9B, 9C) extending between said door frame and lateral door sides, wherein said at least one air inlet port (10) communicates with said first gap section (9A), and wherein said at least one air outlet port (12) communicates at least with said second or third gap section (9B, 9C) at a lower door end for said discharging of said air into said space (5) below said floor.

4. The aircraft of claim 1, wherein said door frame comprises an interior frame section (17) having a frame edge (15), wherein said door comprises an interior door section (8C) having a door edge (16) facing said frame edge (15), and wherein said door structure further comprises an inner seal (14) interposed between said frame edge (15) and said door edge (16).

5. The aircraft of claim 4, wherein said interior frame section (17) comprises a frame molding forming said frame edge (15), and wherein said interior door section (8C) comprises an inner door cover forming said door edge (16).

6. The aircraft of claim 1, further comprising at least one additional air flow channel (11) passing through said door (8) and communicating with said inlet port (10) and with said outlet port (12, 12A) when said door is closed.

7. The aircraft of claim 1, wherein said door comprises an outer skin (8A) forming a flange (8B), said door structure further comprising an outer seal (13) positioned between said flange (8B) and said door frame (7).

8. An aircraft comprising an aircraft body, a floor in said aircraft body dividing said aircraft body into an aircraft cabin above said floor and a space (5) below said floor, a door opening in said aircraft body, a door frame installed in said door opening, a door installed in said door frame, said door frame and said door forming a door structure, at least one air flow channel (11) in said door, at least one upper air inlet port (10) communicating said aircraft cabin with said at least one air flow channel in said door (8) for feeding air into said at least one air flow channel, at least one lower air outlet port (12) communicating said at least one air flow channel (11) with said space (5) for discharging air from said at least one air flow channel (11) into said space (5), wherein said at least one upper air inlet port is spaced above said at least one lower air outlet port (12) for causing an air flow by convection.

9. The aircraft of claim 8, comprising at least one further air flow channel (9A, 9B, 9C) formed as a gap between said door frame (7) and said door (8), and further comprising seals (13, 14) sealing said gap against the exterior and against the interior when said door is closed, said further airflow channel also communicating through said upper inlet port (10) with said aircraft cabin and with said lower outlet port (12).

10. The aircraft of claim 8, wherein said at least one air flow channel passes through said door from said upper inlet port (10) to said lower outlet port (12), said at least one air flow channel (11) communicating with said upper air inlet port (10) and with said lower air outlet port (12) when said door is closed.

* * * * *